United States Patent
Venezia

(10) Patent No.: US 9,550,155 B2
(45) Date of Patent: Jan. 24, 2017

(54) MIXING ELEMENT AND MIXING MODULE FOR TWO AIR FLOWS INTERSECTING IN AN AIR CONDITIONER

(75) Inventor: Vincenzo Venezia, Weil im Schönbuch (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 484 days.

(21) Appl. No.: 13/825,645

(22) PCT Filed: Sep. 6, 2011

(86) PCT No.: PCT/EP2011/065349
§ 371 (c)(1),
(2), (4) Date: May 30, 2013

(87) PCT Pub. No.: WO2012/038246
PCT Pub. Date: Mar. 29, 2012

(65) Prior Publication Data
US 2013/0250718 A1    Sep. 26, 2013

(30) Foreign Application Priority Data
Sep. 23, 2010    (DE) .................. 10 2010 041 282

(51) Int. Cl.
*B01F 5/06* (2006.01)
*B60H 1/00* (2006.01)

(52) U.S. Cl.
CPC ......... *B01F 5/0605* (2013.01); *B60H 1/00035* (2013.01); *B60H 2001/00092* (2013.01)

(58) Field of Classification Search
CPC .................................................... B01F 5/0605
(Continued)

(56) References Cited

U.S. PATENT DOCUMENTS 993,242 A * 5/1911 Grey ................. B21B 1/088
                                                     52/837
1,554,108 A * 9/1925 Lochhead ............ E04C 3/06
                                                     52/837
(Continued)

FOREIGN PATENT DOCUMENTS

CN      201348345 Y    11/2009
DE      38 17 215 C1    7/1989
(Continued)

OTHER PUBLICATIONS

International Search Report, PCT/EP2011/065349, Jan. 19, 2012, 2 pgs.
(Continued)

*Primary Examiner* — David Sorkin
(74) *Attorney, Agent, or Firm* — Paul D. Strain, Esq.; Strain & Strain PLLC

(57) ABSTRACT

Disclosed herein is a mixing element for two air flows intersecting in an air conditioner with a main wall of a mixing region for mixing first and second air flows. The main wall is disposed such that an inflow direction of the first and second air flows into the mixing region run longitudinally with respect to a main extension plane of the main wall. The mixing element includes first and second auxiliary walls of the mixing region, each having a main surface at opposite side edges of the main wall, and disposed such that the inflow direction of the first air flow runs past a side edge of the first auxiliary wall and transverse to the main surface of the first auxiliary wall. The inflow direction of the second air flow into the mixing region runs longitudinally with respect to the main surface of the first auxiliary wall.

17 Claims, 2 Drawing Sheets

(58) Field of Classification Search
USPC .............. 366/181.5, 336, 337, 340; 52/837
See application file for complete search history.

(56) References Cited

U.S. PATENT DOCUMENTS

| | | | |
|---|---|---|---|
| 5,520,459 A * | 5/1996 | Yu et al. ..................... | 366/336 |
| 5,632,675 A | 5/1997 | Kanninen et al. | |
| 5,803,600 A * | 9/1998 | Schubert et al. ............ | 366/144 |
| 6,264,900 B1 * | 7/2001 | Schubert et al. ............ | 422/224 |
| 6,305,834 B1 * | 10/2001 | Schubert et al. ............ | 366/144 |
| 2002/0004367 A1 | 1/2002 | Murai et al. | |

FOREIGN PATENT DOCUMENTS

| | | |
|---|---|---|
| DE | 10 2004 033 856 A1 | 2/2005 |
| EP | 0 749 857 A1 | 12/1996 |
| EP | 1 445 133 A2 | 8/2004 |
| FR | 2 889 486 A1 | 2/2007 |
| JP | 2006-137295 A | 6/2006 |

OTHER PUBLICATIONS

German Search Report, DE 10 2010 041 282.1, Feb. 22, 2011, 4 pgs.
Chinese Office Action, Appl. No. 201180045769, Nov. 25, 2014, 5 pgs.

\* cited by examiner

MIXING ELEMENT AND MIXING MODULE FOR TWO AIR FLOWS INTERSECTING IN AN AIR CONDITIONER

CROSS-REFERENCE TO RELATED PATENT APPLICATIONS

This application is a National Stage of International Application No. PCT/EP2011/065349, filed Sep. 6, 2011, which is based upon and claims the benefit of priority from prior German Patent Application No. 10 2010 041 282.1, filed Sep. 23, 2010, the entire contents of all of which are incorporated herein by reference in their entirety.

The present invention relates to a mixing element for two air flows intersecting in an air conditioner, to a mixing module and also to an air conditioner with the mixing element, which can be used in a vehicle.

In the development of modern air conditioners or air-conditioning systems, in particular those which are used in vehicles, the problem arises that increasingly less installation space is made available in the vehicle for the air-conditioning system (HVAC, heating, ventilating, and air conditioning) and at the same time the requirements of temperature regulation/temperature stratification increase. In order to carry out these tasks, mixing space or installation space is required in the HVAC in which cold and warm air can mix. The temperature regulation/stratification is achieved in many known HVACs with the aid of air-deflecting parts and/or cold and warm ducts.

It is the object of the present invention to provide an improved mixing element for two air flows intersecting in an air conditioner, an improved mixing module for two air flows intersecting in an air conditioner, and an improved air conditioner.

This object is achieved by a mixing element, a mixing module and an air conditioner as claimed in the independent and coordinate claims.

The present invention is based on the finding that two air flows with different temperatures can be optimally mixed in a small installation space if a mixing module with a H-shaped sectional profile or a H-mixing module is used. The mixing module comprises at least one mixing element for improving air mixing in air conditioners and is suitable for two air flows which do not flow parallel to one another. The mixing element is formed with two quasi-parallel walls which are connected in the center by a wall which is arranged normal to both walls and parallel to the intersecting air flows. A contact area between cold and warm air is increased by a multiple by means of such mixing elements, with the result that mixing is considerably accelerated. The mixing module can, for example, be installed downstream of the heating element in the air conditioner. At the same time, the mixing elements serve as ducts in order to guide air with a certain temperature in an undisturbed manner.

It is advantageously possible, by using the mixing module according to the invention, to avoid in the air conditioner the deflecting parts and ducts necessary for temperature regulation and stratification, with the result that there does not occur high pressure losses and reduced output or a reduced deliverable air quantity of an air-conditioning system. Consequently, less installation space is also required in the vehicle for the air-conditioning system. The aforementioned internal fittings in the form of the mixing module have a positive effect in terms of the acoustics, with the result that disturbing noise can be minimized. There is no need to optimize the aforementioned deflecting parts, with the result that development expenditure can be saved, in particular in terms of testing and computation. Consequently, a complex regulation of the system without high development expenditure is possible. The development costs are drastically reduced. Furthermore, the temperature stranding of the air at the duct outlets into the vehicle cabin can be advantageously resolved thanks to the mixing space. As a result, the comfort for the passenger is positively influenced since no temperature stranding is present at the duct outlets.

The present invention provides a mixing element for two air flows intersecting in an air conditioner, wherein the mixing element comprises the following features:

a main wall of a mixing region for mixing a first air flow and a second air flow intersecting the first air flow, the main wall being arranged such that in operation of the mixing element an inflow direction of the first air flow into the mixing region and an inflow direction of the second air flow into the mixing region run longitudinally with respect to a main extension plane of the main wall; and a first and a second auxiliary wall of the mixing region which are in each case mounted with a main surface on opposite side edges of the main wall, the first and the second auxiliary wall being arranged such that in operation of the mixing element the inflow direction of the first air flow into the mixing region runs past a side edge of the first auxiliary wall and transversely with respect to the main surface of the first auxiliary wall, the inflow direction of the second air flow into the mixing region runs longitudinally with respect to the main surface of the first auxiliary wall, and an outflow direction of an air flow mixed from the first and the second air flow out of the mixing region runs past a side edge of the second auxiliary wall and transversely with respect to the main surface of the second auxiliary wall.

The term air conditioner here can be understood to mean an air-conditioning system or a system for heating, ventilating and air conditioning (HVAC), as is used for example in a vehicle. Air flows of different temperatures can be produced and guided in such an air conditioner. Here, these are a first and a second air flow. The air flows can be guided such that they intersect at a point in the air conditioner. The mixing element is arranged at this intersection point, which constitutes a mixing region of the air flows. The mixing element comprises the main wall and the two auxiliary walls. A sectional profile through the main wall and the auxiliary walls of the mixing element can be substantially H-shaped. The inflow directions of the two air flows in operation of the mixing element span the main extension plane of the main wall. Here, the inflow directions can be predetermined by correspondingly arranged and formed inlet openings or guide ducts for the air flows. One shape of the mixing element can be adapted to a geometry of the space in which the mixing element is intended to be installed. This applies in particular to the side edges of the main wall on which no auxiliary walls are mounted, and to the overall dimensioning of the mixing element. Edges of the main wall and of the auxiliary walls can have a straight or curved profile or a mixture of a straight and curved profile, for example a step-shaped and/or arcuate profile.

In this arrangement, the first and the second air flow can flow around the main wall of the mixing region on both sides of its main extension plane. The main wall is thus arranged in the mixing region. Both of its main surfaces can be contacted by the two air flows. This offers the advantage that the mixing of the first and the second air flow can take place more efficiently since the mixing region is available on both sides of the main wall.

Furthermore, a side edge of the first auxiliary wall and a side edge of the second auxiliary wall can have a projection beyond the main extension plane of the main wall. The first and the second auxiliary wall can project to the same degree beyond the main extension plane of the main wall. The projection can be present as viewed from both main surfaces of the main wall. As a result of the projection, side edges of the auxiliary walls project beyond respective main surfaces of the main wall. This offers the advantage that mixing of the two air flows is further improved. Thus, the auxiliary walls projecting from the main surfaces of the main wall give rise to air eddies which promote mixing of the air flows.

According to one embodiment, the first and the second auxiliary wall can extend in each case over at least half a length of the side edge of the main wall on which they are mounted. At least half the length can here mean in particular approximately the whole length. This offers the advantage that the mixing of the air flows is supported over the whole height of the mixing region by the eddies produced by the auxiliary walls and thus becomes more efficient.

Thus, a width of one of the auxiliary walls can be at most a fifth of a spacing between the first and the second auxiliary wall. This condition can apply to both auxiliary walls. The width of one of the auxiliary walls is the spacing between the two side edges of the auxiliary wall past which the first air flow flows. This offers the advantage that a very good mixing and eddying of the air flows results at this dimensional ratio.

The present invention further provides a mixing module for two air flows intersecting in an air conditioner, wherein the mixing module has at least two mixing elements according to the invention.

Mixing elements according to the invention can be advantageously used in the mixing module.

Here, the main walls of the at least two mixing elements can be arranged opposite and spaced apart from one another, it being possible for the main extension planes of the main walls to have a common orientation. The main extension planes of the main walls of the at least two mixing elements can here extend substantially or approximately parallel to one another. Thus, the arrangement of one of the at least two mixing elements with respect to another of the at least two mixing elements can be described by a displacement of one mixing element to the other in a direction which is approximately orthogonal to the main extension planes of their main walls. This offers the advantage that, on account of this arrangement of the at least two mixing elements, a mixing of the two air flows is further optimized.

Furthermore, a spacing between opposite side edges of the auxiliary walls of adjacent mixing elements of the at least two mixing elements can be at most five times a width of an auxiliary wall. This condition on the size ratio means that the mixing of the two air flows can be still further improved.

The present invention also provides an air conditioner which comprises the following features:

a mixing space for two airflows intersecting in the mixing space;

a first inlet duct for a first air flow, which is arranged so as to lead into the mixing space on a first side;

a second inlet duct for a second air flow, which is arranged so as to lead into the mixing space on a bottom side adjoining the first side;

an outlet duct for a mixed air flow, which is arranged to lead out of the mixing space on a second side opposite the first side; and a mixing module according to the invention, which is arranged in the mixing space, it being possible for the first and the second air flow from the inlet ducts to be mixed in the mixing module and for the mixed air flow to be discharged into the outlet duct.

A mixing module according to the invention can be advantageously used in the air conditioner. The mixing space can be the installation space in the air conditioner in which the mixing module can be installed. The shape of the mixing space can be predetermined by the structural conditions of the air conditioner. The first and the second inlet duct and the outlet duct are arranged on different sides of the mixing space. The side of the first inlet duct and the opposite side of the outlet duct can both adjoin the bottom side with the second inlet duct.

Here, the spacing between side edges of the auxiliary walls of the two mixing elements of the mixing module can be at most a third of a dimension of the mixing space in the direction of this spacing. This offers the advantage that, on account of this condition on the size ratio, the mixing of the two air flows can be optimized.

Advantageous exemplary embodiments of the present invention will be explained in more detail below with reference to the accompanying drawings, in which.

In the following description of the preferred exemplary embodiments of the present invention, elements represented in the various drawings and having similar effects will be denoted by identical or similar reference signs, a repeated description of these elements being dispensed with.

Figure 1:
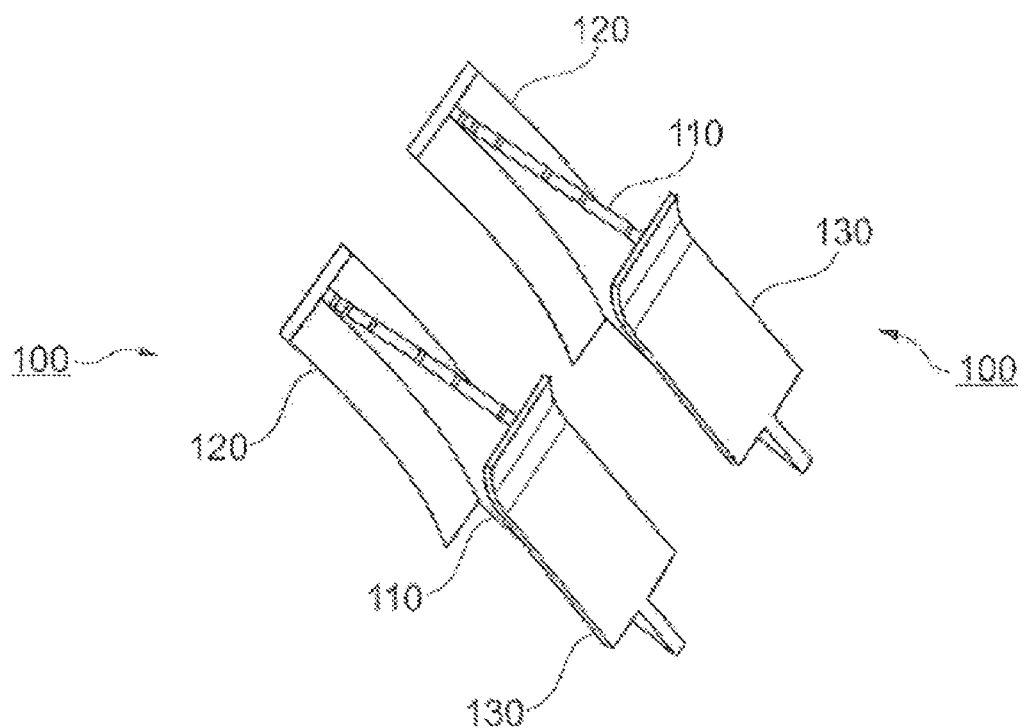
FIG. 1 shows an isometric view of a mixing module with two mixing elements, according to an exemplary embodiment of the present invention.

FIG. 1 shows an isometric view of a mixing module with two mixing elements 100 according to an exemplary embodiment of the present invention. Each of the mixing elements 100 has a main wall 110, a first auxiliary wall 120 and a second auxiliary wall 130. The auxiliary walls 120, 130 are mounted on the main wall 110. The two mixing elements 100 are identical in structure and form, which means that in view thereof only one of the two mixing elements 100 will be described more accurately.

The main wall 110 of the mixing element 100 is a plate-shaped body. The main wall 110 thus has two main surfaces. An outline of the main wall 110 is of asymmetrical shape. FIG. 1 shows an upper edge of the main wall 110 with a step-shaped profile. To be more precise, the upper edge of the main wall 110 has a step-shaped profile which comprises a plurality of descending steps from the side of the first auxiliary wall 120 to the side of the second auxiliary wall 130. Furthermore, a left and a right side edge of the main wall 110 and also a lower edge of the main wall 110 are represented in FIG. 1 with a concavely curved profile. The main wall 110 extends along a main extension plane between the first auxiliary wall 120 and the second auxiliary wall 130.

The first auxiliary wall 120 is represented in FIG. 1 as being mounted on the left side edge of the main wall 110. The outline of the first auxiliary wall 120 is rectangular, with a length of a longitudinal side corresponding to a multiple length of a narrow side. In other words, the outline of the first auxiliary wall 120 corresponds to an oblong rectangle. In the course of its longitudinal direction along a longitudinal side, the first auxiliary wall 120 is curved or bent. The curvature follows the curvature of the side edge of the main wall 110 on which the first auxiliary wall 120 is mounted. The first auxiliary wall 120 is thus mounted on the adjoining side edge of the main wall 110 such that the entire side edge is covered by the first auxiliary wall 120. In FIG. 1, the first auxiliary wall 120 is continuously curved along its longitudinal direction. A main extension plane of the first auxiliary wall 120 is at an angle to the main extension plane of the main wall 110. To be more precise, this is a right angle. A width of the first auxiliary wall 120 along a narrow side is dimensioned such that the first auxiliary wall 120 projects beyond both main surfaces of the main wall 110. In FIG. 1, the amount by which the first auxiliary wall 120 projects beyond each of the two main surfaces of the main wall 110 corresponds approximately to four times the thickness of the main wall 110.

The second auxiliary wall 130 has in FIG. 1 approximately the same outline, the same orientation with respect to the main wall 110 and the same dimensioning as the first auxiliary wall 120. Therefore, only differences of the second auxiliary wall 130 with respect to the first auxiliary wall 120 will be discussed at this point. However, the second auxiliary wall 130 differs from the first auxiliary wall 120 in FIG. 1 in its curvature along its longitudinal direction. The curvature along the longitudinal direction of the second auxiliary wall 130 is adapted to the curvature of the side edge of the main wall 110 on which the second auxiliary wall 130 is mounted. It is indicated in FIG. 1 that the second auxiliary wall 130 is not continuously curved or bent along its longitudinal direction. It can be seen that the curvature of the second auxiliary wall 130 is present mainly in an upper portion thereof. A profile of the second auxiliary wall 130 in a lower portion thereof is approximately straight. The second auxiliary wall 130 extends from an upper end of the adjoining side edge of the main wall 110 to not quite as far as the lower end of the side edge. A portion of the side edge adjoining the second auxiliary wall 130 remains exposed. A length of this exposed portion corresponds approximately to the width of one of the auxiliary walls 120, 130.

The two mixing elements 100 which belong to the mixing module are arranged relative to one another such that main surfaces of the main walls 110 of the mixing elements 100 are opposite one another. The mixing elements 100 are spaced apart along a direction which extends orthogonally to the main extension planes of the main walls 110 of the mixing element 100. In FIG. 1, the spacing between in each case opposite side edges of the auxiliary walls 120, 130 is approximately a width of one of the auxiliary walls 120, 130.

The shapes, dimensions and arrangements of elements which are described in this exemplary embodiment are merely given as examples, and further exemplary embodiments can have different shapes, dimensions and arrangements of elements depending on the geometry of the installation space in which the mixing module is to be installed.

Figure 2:
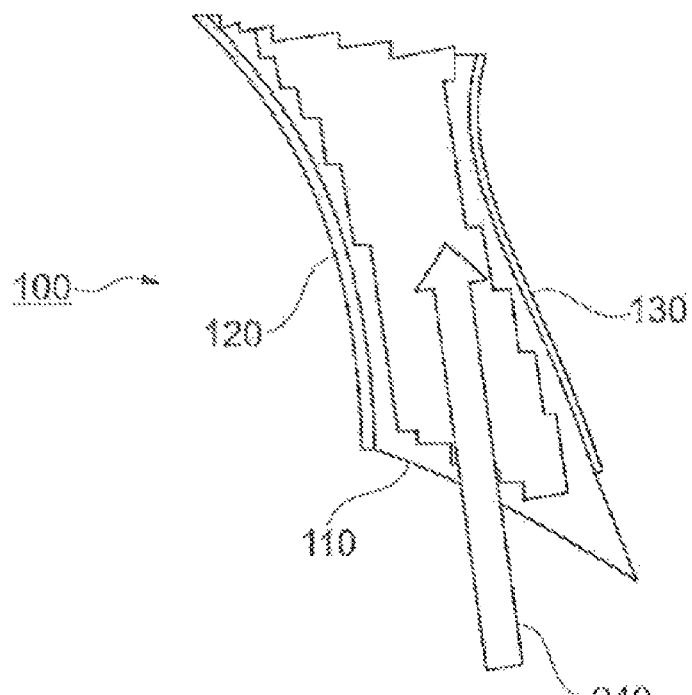
FIG. 2 shows a side view of one of the mixing elements of the mixing module from FIG. 1.

FIG. 2 shows a side view of one of the mixing elements 100 of the mixing module from FIG. 1. Here, in FIG. 2, the main wall 110 is represented between the first auxiliary wall 120 and second auxiliary wall 130. FIG. 2 additionally indicates, by way of an arrow 240, an air flow with a flow direction which, in the drawing plane of FIG. 2, extends from a lower edge of the main wall 110 along a main extension direction of the main wall 110 to the upper edge of the main wall 110. The air flow 240 is an air flow with a temperature $T_u$. The first auxiliary wall 120 is shown on the left in FIG. 2 and the second auxiliary wall 130 is represented on the right. Of the main wall 110, one of the main surfaces is visible in FIG. 2. The profile of all the edges of the main wall 110 can also be seen from FIG. 2. In the side view of FIG. 2, the first auxiliary wall 120 and the second auxiliary wall 130, which are mounted on the main wall 110 approximately at right angles thereto are thus shown in profile or with a view of in each case one side edge thereof. Therefore, the respective curvature of the two main walls 120, 130 is evident.

The main wall 110 has four peripheral edges which represent an outline of the main wall 110. The upper edge of the main wall 110 has the step-shaped profile, the steps having different heights and lengths. In FIG. 2, for example, six such steps are shown. The lower edge of the main wall 110 has a slightly curved profile. On the side of the second auxiliary wall 130, the lower edge of the main wall 110 forms an acute angle with the adjoining side edge. The side edges of the main wall 110 are at least partially curved. The side edge of the main wall 110 that is represented on the left in FIG. 1 is curved or bent substantially over its entire profile. The side edge of the main wall 110 that is shown on the right in FIG. 1 has in its upper region, to be more precise in its upper quarter, a curvature and has substantially no curvature in its remaining region. A length of the side edge which is represented on the left and on which the first auxiliary wall 120 is mounted is somewhat smaller than a length of the side edge which is represented on the right and on which the second auxiliary wall 130 is mounted.

The first and the second auxiliary wall 120, 130 are bent or curved in longitudinal profile corresponding to the respectively adjoining side edges of the main wall 110. The longitudinal profile of the first auxiliary wall 120 follows the profile of the adjoining side edge (shown on the left in FIG. 2) of the main wall 110. Thus, the first auxiliary wall 120 is continuously curved in longitudinal profile. The longitudinal profile of the second auxiliary wall 130 follows the profile of the adjoining side edge (shown on the right in FIG. 2) of the main wall 110. Thus, the second auxiliary wall 130 is curved in an upper region and extends in a substantially straight manner in a lower region. The second auxiliary wall 130 extends from the upper end of the adjoining side edge of the main wall 110 to not quite as far as the lower end thereof.

Figure 3:
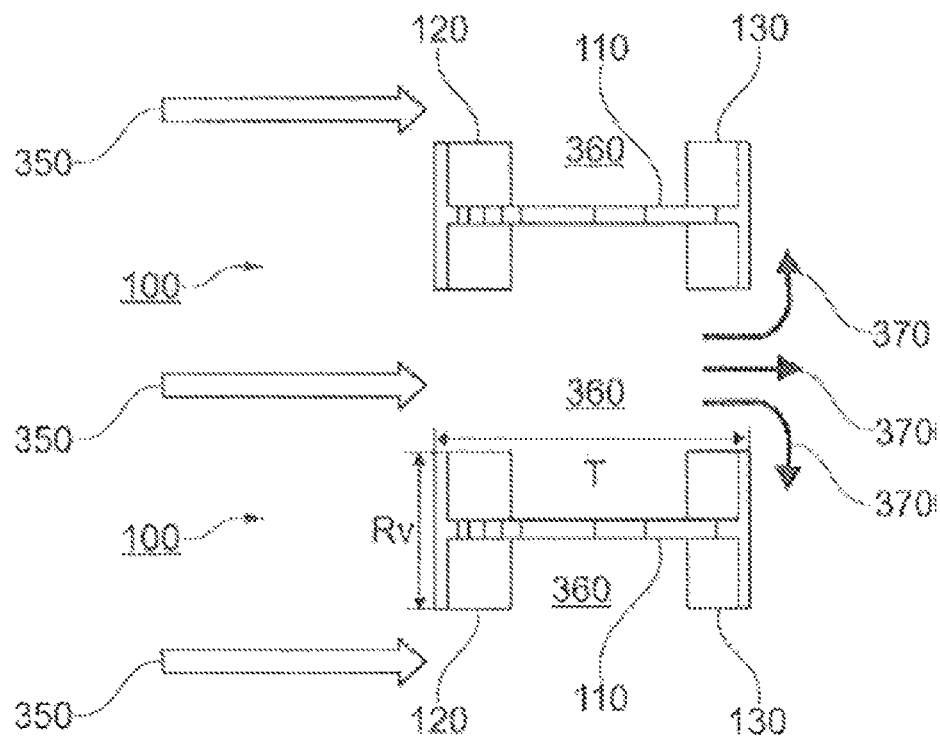
FIG. 3 shows a plan view of the mixing module from FIG. 1.

FIG. 3 shows a plan view of the mixing module from FIG. 1. The plan view in FIG. 3 shows, in addition to the two mixing elements 100, an air flow 350 indicated by three arrows, a mixing region 360, a mixed air flow 370 indicated by three further arrows, an auxiliary wall width Rv and a spacing T of the first auxiliary wall 120 from the second auxiliary wall 130. The plan view of FIG. 3 reveals an H-shaped outline of each mixing element 100 in profile which is in each case formed by the first auxiliary wall 120, the main wall 110 and the second auxiliary wall 130.

The air flow 350, which in FIG. 3 flows from the left edge of the drawing in the drawing plane to the right, initially strikes the first auxiliary walls 120 of the two mixing elements 100. The air flow 350 then flows past the first side walls 120 at their side edges and enters the mixing region 360. The air flow 350 has a temperature $T_o$.

The air flow 240 having the temperature $T_u$ also enters in the mixing region 360. Although the air flow 240 is not illustrated in FIG. 3, it would flow in this illustration in the mixing region 360 out of the drawing plane in the direction of a viewer of FIG. 3. Thus, the air flow 240 having the temperature $T_u$ and the air flow 350 having the temperature $T_o$ are mixed in the mixing region 360. The mixing region 360 begins, as viewed in the flow direction of the air flow 350, at those main surfaces of the first auxiliary walls 120 which face the respective second auxiliary walls 130. The mixing region 360 extends as far as the second auxiliary walls 130, to be more precise as far as those main surfaces of the second auxiliary walls 130 which face the first auxiliary walls 120, or else beyond the second auxiliary walls 130 to the right in FIG. 3. The mixing region 360 extends in FIG. 3 also between the mixing elements 100, and above and below the latter. The exact limits of the mixing region 360 also depend on the geometry of the space in which the mixing module is installed.

The mixed air flow 370 which is mixed from the air flow 240 and the air flow 350 exits the mixing region 360 in the region of the second auxiliary walls 130 of the mixing elements 100. The mixed air flow 370 first of all runs along the same direction as the air flow 350. Depending on the geometry of the space in which the mixing module is installed, the mixed air flow 370 can also change its direction after leaving the mixing region 360. For example, the mixed air flow 370 can be divided after leaving the mixing region 360, as is represented in FIG. 3.

The auxiliary wall width Rv and the spacing T of the first auxiliary wall 120 from the second auxiliary wall 130 are depicted in FIG. 3 by way of example for the lower mixing element 100, but of course also apply to the upper mixing element 100 in FIG. 3. The auxiliary wall width Rv corresponds to an extension of a narrow side edge of a first auxiliary wall 120 of a mixing element 100. The spacing T of the first auxiliary wall 120 from the second auxiliary wall 130 is measured between those main surfaces of the first and the second auxiliary wall 120, 130 that face away from one another. For a ratio of the auxiliary wall width Rv to the spacing T, it generally holds that Rv/T≥0.2 for a good mixing result in the mixing region 360. In FIG. 3, the ratio in both mixing elements 100 is approximately 0.5 and the two mixing elements 100 have substantially the same dimensions and size ratios.

Figure 4:
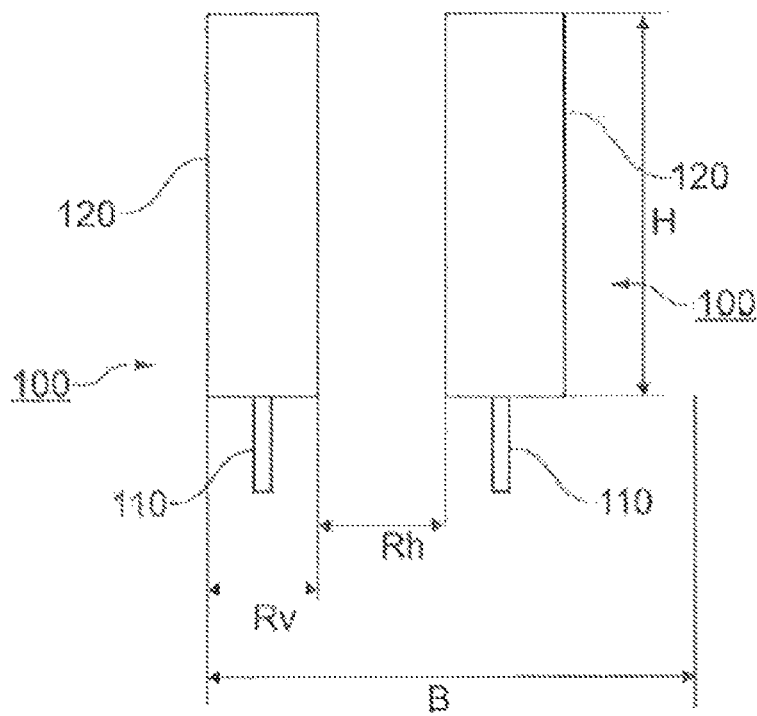
FIG. 4 shows a front view of the mixing module from FIG. 1.

FIG. 4 shows a front view of the mixing module from FIG. 1. The view in FIG. 4 of the mixing elements 100 of the mixing module is given along the flow direction of the air flow 350 in FIG. 3. Thus, there can be seen in the illustration of the mixing elements 100 the main surfaces of the first auxiliary walls 120 that face the air flow 350 and also lower portions of the narrow sides of the main walls 110. The two mixing elements 100 have substantially the same dimensions and size ratios. In the front view of FIG. 4, further dimensions and size ratios are illustrated on the two mixing elements 100 represented.

Thus, FIG. 4 depicts a spacing Rh between opposite side edges of the first auxiliary walls 120 of the two mixing elements 100, a width B of an entire air-conveying duct in the space in which the mixing module is installed, and a height H of the first auxiliary walls 120 of the mixing elements. The height H of the first auxiliary walls 120 of the mixing elements 100 can also correspond to the height of the second auxiliary walls 130. The height H corresponds to the extension of a longitudinal side edge of a first auxiliary wall 120. The width B is selected arbitrarily in FIG. 4 since the entire air-conveying duct is not represented. The spacing Rh does not have to apply only to the opposite side edges of the first auxiliary walls 120, but can also apply to the opposite side edges of the second auxiliary walls 130, although the latter are not represented in FIG. 4. Furthermore, FIG. 4 once again depicts the auxiliary wall width Rv.

For an optimum mixing result of the two air flows, the following size ratios apply in the mixing module. Thus, in general the ratio B/Rh≥3 applies for the relationship between the width B of the entire air-conveying duct and the spacing Rh. In FIG. 4, this ratio is approximately 4. Here, the auxiliary wall width Rv has a ratio to the spacing Rh of generally Rv/Rh≥0.2. In FIG. 4, this ratio is approximately 1. Furthermore, in FIG. 4, the height H corresponds to approximately four times the auxiliary wall width Rv for both mixing elements 100.

The exemplary embodiments described are only chosen by way of example and can be combined with one another. Exemplary embodiments of the present invention can also have only parts of the elements shown in the figures.

The invention claimed is:

1. A mixing element for two air flows intersecting in an air conditioner, wherein the mixing element comprises the following features:
    a main wall of a mixing region comprising a plate-shaped body having four edges, wherein a first edge of the four edges has a step-like profile, wherein a second edge, a third edge, and a fourth edge of the four edges each have a curved profile; and
    a first and a second auxiliary wall, wherein the first and second auxiliary walls are curved, wherein the first and second auxiliary wall are each mounted on opposite side edges of the main wall,
    wherein a width of one of the auxiliary walls is Rv, wherein a spacing between the first auxiliary wall and the second auxiliary wall is T, and wherein Rv/T≥0.2.

2. The mixing element as claimed in claim 1, wherein a side edge of the first auxiliary wall and a side edge of the second auxiliary wall have a projection beyond the main extension plane of the main wall.

3. The mixing element as claimed in claim 1, wherein the first and the second auxiliary wall extend in each case over at least half a length of the side edge of the main wall on which they are mounted.

4. A mixing module for two air flows intersecting in an air conditioner, wherein the mixing module has at least two mixing elements according to claim 1 arranged adjacent to one another.

5. The mixing module as claimed in claim 4, wherein the main walls of the at least two mixing elements are arranged opposite and spaced apart from one another, the main extension planes of the main walls having a common orientation.

6. The mixing module as claimed in claim 5, wherein a spacing between opposite edges of the first auxiliary walls of the two mixing elements is Rh, and wherein Rv/Rh≥0.2.

7. An air conditioner, comprising:
    a mixing space for two airflows intersecting in the mixing space;
    a first inlet duct for a first air flow, which is arranged so as to lead into the mixing space on a first side;
    a second inlet duct for a second air flow, which is arranged so as to lead into the mixing space on a bottom side orthogonal to the first side;
    an outlet duct for a mixed air flow, which is arranged to lead out of the mixing space on a second side opposite the first side; and
    a mixing module as claimed in claim 4, which is arranged in the mixing space.

8. The air conditioner as claimed in claim 7, wherein a spacing between opposite edges of the first auxiliary walls of the two mixing elements is Rh, wherein a width of an entire air conveying duct in a space in which the mixing module is installed is B, wherein B/Rh≥3, and wherein Rv/Rh≥0.2.

9. A mixing element for two air flows intersecting in an air conditioner, wherein the air flows comprise the following features:
    a first air flow;

a second air flow, wherein the first air flow runs orthogonally to the second air flow and intersects the second air flow in a mixing region of the mixing element;

wherein the mixing element comprises the following features:

a main wall of the mixing region comprising a plate-shaped body having four edges, wherein a first edge of the four edges has a step-like profile, wherein a second edge, a third edge, and a fourth edge of the four edges each have a curved profile, wherein the main wall is arranged such that the first air flow and the second air flow run parallel to the main wall and enter into the mixing region which is bounded in part by the main wall; and a first and a second auxiliary wall, wherein the first and second auxiliary walls are curved, wherein the first and second auxiliary wall are each mounted on opposite side edges of the main wall, wherein the first and the second auxiliary walls are arranged such that (a) the first air flow runs past a side edge of the first auxiliary wall and transversely with respect to a main surface of the first auxiliary wall, (b) the second air flow runs longitudinally with respect to the main surface of the first auxiliary wall, and (c) a mixed air flow having air mixed from the first air flow and the second air flow which runs past a side edge of the second auxiliary wall and transversely with respect to the main surface of the second auxiliary wall, wherein a width of one of the auxiliary walls is Rv, wherein a spacing between the first auxiliary wall and the second auxiliary wall is T, and wherein $Rv/T \geq 0.2$.

10. The mixing element as claimed in claim 9, wherein the first air flow and the second air flow extend around the main wall of the mixing region on both sides of its main extension plane.

11. The mixing element according to claim 1, wherein a region of the main wall abutting the second edge, the third edge, and the fourth edge bounds a main surface of the main wall, wherein the boundary between said region and the main surface has a step-like profile.

12. The mixing element for two air flows intersecting in an air conditioner according to claim 9, wherein a region of the main wall abutting the second edge, the third edge, and the fourth edge bounds a main surface of the main wall, wherein the boundary between said region and the main surface has a step-like profile.

13. The mixing element for two air flows intersecting in an air conditioner according to claim 9, wherein a side edge of the first auxiliary wall and a side edge of the second auxiliary wall have a projection beyond the main extension plane of the main wall.

14. The mixing element for two air flows intersecting in an air conditioner according to claim 9, wherein the first and the second auxiliary wall extend in each case over at least half a length of the side edge of the main wall on which they are mounted.

15. A mixing module for two air flows intersecting in an air conditioner, wherein the two air flows flow through the first air flow and the second air flow according to claim 9, wherein the first air flow and the second air flow intersect in the air conditioner, wherein the mixing module has at least two mixing elements according to claim 9 arranged adjacent to one another.

16. The mixing module for two air flows intersecting in an air conditioner according to claim 15, wherein the main walls of the at least two mixing elements are arranged opposite and spaced apart from one another, the main extension planes of the main walls having a common orientation.

17. The mixing module for two air flows intersecting in an air conditioner according to claim 16, wherein a spacing between opposite edges of the first auxiliary walls of the two mixing elements is Rh, and wherein $Rv/Rh \geq 0.2$.

* * * * *